(12) United States Patent
Mallet

(10) Patent No.: US 9,818,201 B2
(45) Date of Patent: Nov. 14, 2017

(54) EFFICIENT LENS RE-DISTORTION

(71) Applicant: LUCASFILM ENTERTAINMENT COMPANY, LTD., San Francisco, CA (US)

(72) Inventor: Ronald Mallet, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 1 day.

(21) Appl. No.: 14/579,507

(22) Filed: Dec. 22, 2014

(65) Prior Publication Data

US 2016/0180501 A1    Jun. 23, 2016

(51) Int. Cl.
*G06T 5/00*    (2006.01)
*G06T 7/00*    (2017.01)
*G06T 3/00*    (2006.01)

(52) U.S. Cl.
CPC .......... *G06T 7/0081* (2013.01); *G06T 3/0018* (2013.01); *G06T 5/006* (2013.01); *G06T 2207/20021* (2013.01)

(58) Field of Classification Search
None
See application file for complete search history.

(56) References Cited

U.S. PATENT DOCUMENTS

| | | | | |
|---|---|---|---|---|
| 7,912,317 B2* | 3/2011 | Souchard | ............. | G06T 3/0018 345/647 |
| 8,116,586 B2* | 2/2012 | Souchard | ............. | G06T 3/0018 345/647 |
| 8,446,433 B1* | 5/2013 | Mallet | ............. | G06T 5/006 345/581 |
| 2014/0003706 A1* | 1/2014 | Davidson | ............. | G06K 9/00201 382/154 |
| 2014/0369592 A1* | 12/2014 | Laengle | ............. | G06T 7/80 382/144 |
| 2016/0025846 A1* | 1/2016 | Mostov | ............. | G06K 9/00771 342/28 |

OTHER PUBLICATIONS

Lee, W.—"Correction Method for Geometric Image Distortion with Application to Printed Circuit Board Inspection Systems"—ICROS-SICE 2009, pp. 4001-4006.*

* cited by examiner

*Primary Examiner* — Bernard Krasnic
(74) *Attorney, Agent, or Firm* — Kilpatrick Townsend & Stockton LLP

(57) ABSTRACT

Methods and systems efficiently apply known distortion, such as of a camera and lens, to source image data to produce data of an output image with the distortion. In an embodiment, an output image field is segmented into regions so that on each segment the distortion function is approximately linear, and segmentation data is stored in a quadtree. The distortion function is applied to the segmented image field to produce a segmented rendered distortion image (SRDI) and a corresponding look-up table. To distort a source image, a location in the output image field is selected, and the uniquely colored segment at the same location in the SRDI is found. The look-up table provides the local linear inverse of the distortion function, which is applied to determine from where in the source image to take image texture data for the distorted output image.

20 Claims, 17 Drawing Sheets

Barrel distortion

Pincushion Distortion

Mustache Distortion

EFFICIENT LENS RE-DISTORTION

BACKGROUND

Images, both still images and video images, are often referenced by a camera system and recorded in digital forms. Camera systems comprise at least one lens which focuses light from a physical scene onto an image plane, which for digital recording can be a planar array of light receptors in a charge coupled device (CCD). Image data recorded electronically (such as by a CCD) can be modified using various image processing techniques, for example, color filtering, edge detection, and noise removal.

Lenses of the cameras in the aforementioned camera systems often cause distortions from what would be recorded by an ideal pinhole camera. In the ideal pinhole camera, a point on an object in the physical scene has a corresponding image point on an image plane such that the object point, the pinhole point and the corresponding image point all lie on the same line in a three-dimensional space. Actual lenses will typically not achieve the ideal due, for example, to their finite size, refraction and manufacturing imperfections.

In order to accurately work with, add or edit images captured with distortion in a computer graphics environment, typically either a distorted computer generated is produced and added to the distorted image, or the distorted image is corrected to remove the distortion and an undistorted version of the computer graphic is added to the image. In the latter approach once the images have been processed by the animation or graphic artists (e.g., edited to add one or more graphic objects to the image), it is frequently desirable to reintroduce the lens distortion into the processed images for usage in content (e.g. feature films). For example, the edited image may represent a frame in a movie that needs to be re-distorted in order to match earlier and/or later frames in the movie that include the original distortion.

Correcting for lens distortion is typically performed using a relatively efficient lens correction algorithm. To generate lens distortion in an already corrected image, however, is typically a much more complex problem that may require a specialized solver and several orders of magnitude more computational resources than what is required for correcting for the distortion.

BRIEF SUMMARY

Embodiments are disclosed for methods, systems and computer program products for re-distorting an image that was previously corrected for lens distortion, and in general for applying a known distortion to any image. According to some embodiments of the invention, when a distorted image is first corrected using a lens correction or other distortion correction algorithm, values for the distorted image and the corrected image are stored in a lookup table or other data structure, which in one embodiment can be a quadtree. Thereafter, when the corrected image (or an edited version of the corrected image) needs to be re-distorted, the lookup table can be accessed to identify the entry for the corrected image and values stored in the lookup table are used to quickly and efficiently re-distort the image.

In some embodiments where the lookup table is a quadtree, a quadtree decomposition of the image is generated, where each quad of the quadtree decomposition corresponds to a linear transform. Thereafter, a distorted quadtree is generated by applying the determined distortion function (e.g., distortion polynomials) to the quadtree decomposition. The distorted quadtree and the quadtree decomposition may be subsequently used to generate a corrected input image, where the corrected input image has its distortion removed. In some embodiments, the distorted quadtree and the quadtree decomposition may be stored for subsequent access and/or use. Specifically, at a later time following any processing of the corrected input image, the corrected input image may have to be re-distorted. To re-distort the image, the previously generated quadtree decomposition and distorted quadtree are retrieved. The retrieved distorted quadtree is then used to determine an inverse linear transform corresponding to each quad in the quadtree decomposition. The determined inverse linear transforms are applied to the corrected input image in order to re-distort image.

Embodiments enable a distorted image to be quickly and efficiently generated from a previously corrected image. Specifically, embodiments store or cache the distorted quadtree and quadtree decomposition generated during an initial correction of an input image. When re-distortion or inversion of the corrected input image is required, embodiments use the stored or cached distorted quadtree and quadtree decomposition to re-distort the image rather than calculating an associated inverse distortion function, which can require a large amount of computational resources.

Embodiments are disclosed for methods, systems and computer program products for applying distortion to an image. The distortion may arise from a lens in a camera system and known from a previous calibration, or the distortion could be generated by a computer or artist. In particular, an input image that includes lens distortion may be received, where the input image was captured by a camera system and the distortion can be described according to a known or determined distortion function that is, for example, based at least in part on one or more attributes of the camera system.

In some embodiments, a segmented reference distortion image (SRDI) is generated by decomposing an initial image plane into initial segments on which the distortion function and its inverse are readily approximated, such as by a linear transform and its inverse. The SRDI may comprise a decomposition of a reference image field into reference segments determined by applying the distortion function to the undistorted initial segments of a decomposition of the initial image field. The SRDI may also comprise an enumeration, such as a look-up table (LUT), that correlates the reference segments of the SRDI with the approximate inverses of the distortion function for the reference segments. A quadtree data structure that implements a hierarchical organization of the reference segments and approximate inverses of the SRDI may be generated and stored for subsequent access and use.

To apply distortion to a source image, the SRDI is first retrieved. Given a first location in the distorted image to be created from the source image, the SRDI is used to select the approximate inverse to be applied to the first location to find a corresponding second location in the source image. Color or texture information at the corresponding second location is then applied to the first location in the distorted image being created.

Embodiments enable a distorted image to be quickly and efficiently generated from a source image, such as a previously corrected image. Specifically, some embodiments may store or cache a distorted quadtree and quadtree decompositions. When re-distortion or inversion of the corrected source image is required, embodiments use the stored or cached distorted quadtree and quadtree decomposition to re-distort the image rather than calculating an exact inverse of the distortion function, which can require a large amount of computational resources.

DETAILED DESCRIPTION

I. Introduction

The following sections disclose exemplary embodiments for applying distortion to an image, such as when re-distorting or inverting, at least approximately, a previously corrected image. Section II gives information regarding image capture and the possible distortions that can arise. Additionally, methods for correcting such distortions are presented. Section III describes embodiments for applying distortion using a previously corrected source image to produce an output image by using a segmented rendered distortion image. Section IV describes additional and/or alternative embodiments for producing a segmented rendered distortion image and a quadtree data structure. Section V describes additional and/or alternative embodiments for applying a distortion. Section VI describes an exemplary computer system that may be used to implement the embodiments.

II. Origins of Image Distortion and Distortion Correction

Figure 1:
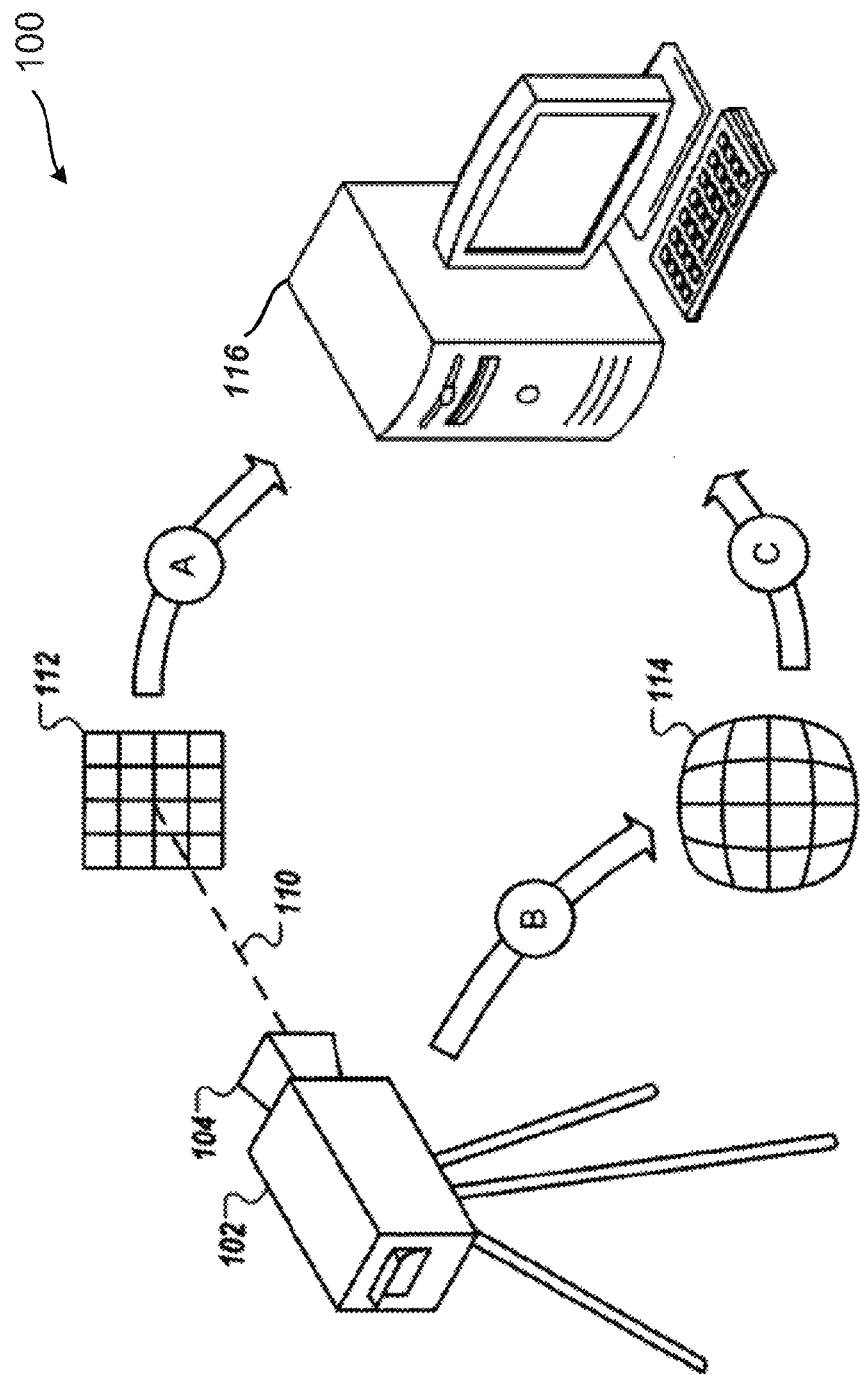
FIG. 1 is a block diagram of a camera and lens system for capturing images, according to an embodiment.

FIG. 1 is a block diagram of an exemplary image processing system 100 that can produce image data in digital or electronic form. The system 100 may be configured to capture motion or still images. The system 100 includes at least one camera 102, and in some embodiments more than one camera. A camera 102 includes, along with other components, a lens 104, that may fall into one of many categories, e.g. macro lens, stereo lens, wide-angle lens, fisheye lens, zoom lens, telephoto lens, etc. The camera and lens are configured to capture image data of object 112 existing in a physical scene. Image data, whether for a single still image or for one image in a video sequence, may be acquired by various means, e.g. by use of charge coupled devices or by film.

The image processing system 100 includes a computer system 116 capable of processing and/or modifying the image data. Images acquired by film may be converted to digital form by scanning or other means. In digital form, image data may comprise a table of pixel values. The pixel values may be grey scale data, RGBα (Red, Green, Blue, transparency) color data, or other image data. The image data may be encoded using various encoding methods, such as JPEG, MPEG, or others.

In the situation in FIG. 1, the object 112 is a right angle rectangular grid pattern. The camera and lens are oriented so that the optical axis of the lens passes through the center of the object. In this example the measurements of the grid pattern are presumed to be accurately known. These measurements can be input into the computer system 116, as illustrated by the process arrow A of FIG. 1. The computer system can use the measurements to predict a corresponding ideal image that would be produced if the camera and lens system functioned as an ideal pinhole camera. In the case of the right angle grid pattern 112, an ideal pinhole camera would reproduce the grid also as an ideal right angle grid but at a smaller magnification.

The camera and lens system can acquire image data 114 of the object, as illustrated by the process arrow B. The image data acquired by the camera and lens system spans a two-dimensional area termed herein a capture image field. The shape of the capture image field can be determined by the arrangement of the light receptors of a CCD, by selection of a preset subfield of the CCD array during processing, or by other means. However, either by the inherent distorting properties of the lens (such as in fisheye lenses) or by manufacturing imperfections, the acquired image data 114 may not perfectly correspond what an ideal pinhole camera would produce, i.e., the acquired image data may include distortions and may thus be referred to as a "distorted image". In the case of the right angle grid pattern 112, the acquired image data 114 can be input into the computer system 116, as illustrated by the process arrow C of FIG. 1, and compared to the predicted pinhole image.

Figure 2:
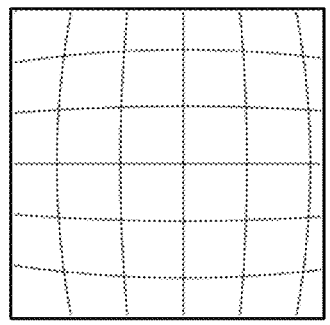
FIG. 2 illustrates various types of image distortions.
Figure 2:
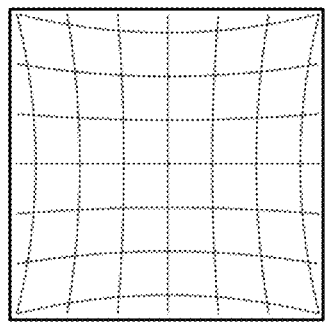
Figure 2:
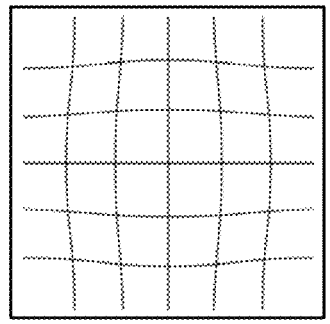

FIG. 2 illustrates various types of image distortions that can be produced by a lens or other means. The examples shown are not an exhaustive listing. The exemplary distorted images illustrated in FIG. 2 are what could be produced when the ideal rectangular grid 112 is captured by the camera and lens system of FIG. 1. The capture image field in these cases is the rectangular array shown surrounding each distorted image. A first distortion type is the barrel distortion 210, which can occur by design with fisheye or telephoto lenses, or in standard lenses by manufacturing imperfections. In barrel distortion the magnification decreases with distance away from the optical axis of the lens. A second type of distortion is pincushion distortion, in which the magnification increases with distance away from the optical axis of the lens. A third type of distortion is termed mustache distortion, in which both effects of barrel and pincushion distortion occur. Other types of distortion may involve non-symmetric or non-radial distortions about the lens axis. Embodiments disclosed herein are not limited to correcting or applying particular types of distortions, but can be applied to any pre-determined distortion, whether computer-generated or such as those of a given camera and lens system.

A given camera and lens system can have its distortion determined before use, by any of various known methods. One exemplary method is based on the capturing of test images, such as the grid pattern 112, with precisely known geometric patterns and measurements. By comparing predicted ideal image data (such as from a pinhole camera) with the image data acquired by the camera and lens combination, a functional form of the distortion, such as in equation (1), can be determined. In the exemplary form of equation (1) the distortion function is referenced with respect to cartesian coordinate systems: the input coordinates are from the image plane of an ideal or undistorted image, and the output coordinates are with respect to the image plane of the distorted image:

$$\begin{pmatrix} x_d \\ y_d \end{pmatrix} = \vec{P} \begin{pmatrix} x_u \\ y_u \end{pmatrix} = \begin{pmatrix} P_1(x_u, y_u) \\ P_2(x_u, y_u) \end{pmatrix} \quad (1)$$

A particular class of functional forms often, but not exclusively, used is a Brown-Conrady model, in which the function $\vec{P}$ has polynomials for its two component functions, and which is designed to approximate both radial and tangential distortion effects. As an example to illustrate the possible complexity of the functional form, in one implementation the Brown-Conrady model has the form, for $(x_d, y_d)^T = \vec{P}(x_u, y_u)^T)$ as in equation (1), with component polynomials given by the following:

$$x_d = x_u(1 + K_1 r^2 + K_2 r^4 + \ldots) + (2c_1 x_u y_u + c_2(r^2 + 2x_u^2))(1 + c_3 r^2 + c_4 r^4 + \ldots) \quad (2A)$$

and $$y_d = y_u(1 + K_1 r^2 + K_2 r^4 + \ldots) + (2c_2 x_u y_u + c_1(r^2 + 2y_u^2))(1 + c_3 r^2 + c_4 r^4 + \ldots), \quad (2B)$$

in which $r^2 = (x_u - x_c)^2 + (y_u - y_c)^2$, where $(x_c, y_c)$ is the distortion center, and the coefficients $K_j$ and $c_i$ are specific to each camera and lens. Each component function becomes a polynomial according to where the two series in each are truncated. The coefficients $K_j$ and $c_i$ can be determined by various optimization or best fit algorithms, such as least squares, that compare values of $(x_u, y_u)^T$ selected from the ideal test image with corresponding values of $(x_d, y_d)^T$ from the acquired test image.

The process of fitting the functional form of $\vec{P}$ to the particular camera and lens using test images is often called calibration. In some cases different calibrations can be created even for the same lens and camera to the account for different distortions that can occur for different settings of the same lens, such as for a telephoto lens at different magnification levels. As already noted, the particular functional form for $\vec{P}$ can be other than polynomial, and can be adapted for the particular image reference system. Embodiments disclosed herein may be used with known alternative forms of $\vec{P}$.

As the particular Brown-Conrady model of equations (2A) and (2B) illustrates, the functional form of $\vec{P}$ can be fairly complicated and numerically intensive. As noted, computing an expected distortion, i.e. that a point that would have coordinates $(x_u, y_u)^T$ in an ideal image would be located at $(x_d, y_d)^T$ in an image acquired with a lens of that distortion, simply involves applying $\vec{P}$ to $(x_u, y_u)^T$. However, the inverse operation, in which coordinates $(x_d, y_d)^T$ of a distorted image are known and the corresponding undistorted coordinates $(x_u, y_u)^T$ are desired, involves inverting the functional form of $\vec{P}$. In the situations in which an analytic form for the inverse of $\vec{P}$ cannot be determined, the inverse operation often involves using a root-finding operation, such as steepest-descent, conjugate gradient, or a derivative-free method such as the Nelder-Mead method. Root-finding processes are typically iterative methods, involving many computations of $\vec{P}$, and sometimes its derivatives, to obtain $(x_u, y_u)^T$ for a given $(x_d, y_d)^T$. This can be a numerically intensive and time-consuming operation. This difficulty is magnified in the case of high resolution images (involving many acquired pixel locations $(x_d, y_d)^T$ in a single image) and for video images.

Figure 3:
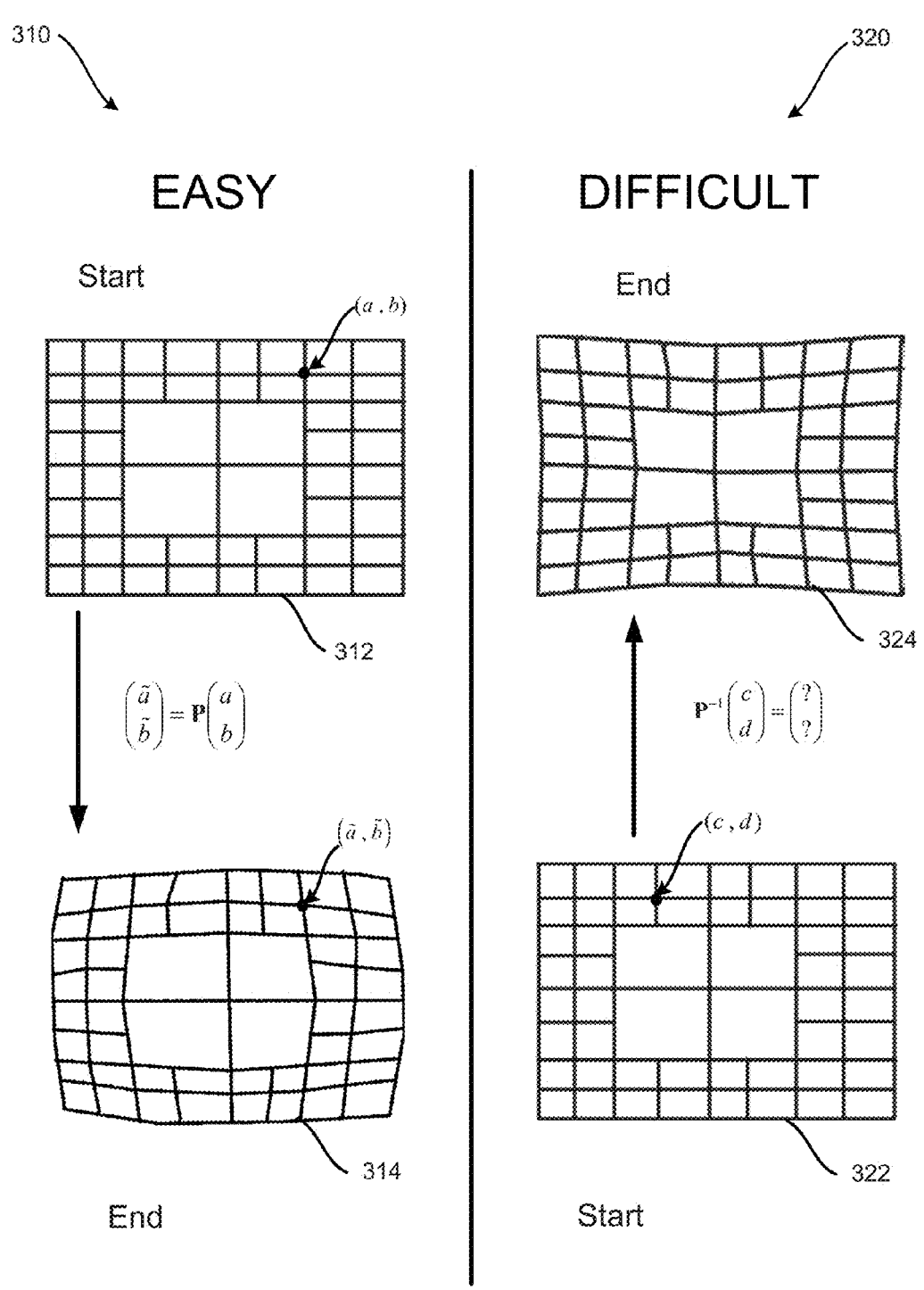
FIG. 3 illustrates a use of a distortion function to modify a segmented image field.

FIG. 3 illustrates an example of the problem. In the easy case 310, a user starts with a grid 312, and determines a distorted version 314 of the grid, using the known distortion function P. Given the coordinates of a point of the original grid, application of $\vec{P}$ immediately gives the resulting coordinates in the distorted version of the grid. As discussed below with respect to FIG. 4A, the distorted grid 314 can be used in methods of correcting distortion. However, in the difficult case 320, a user starts with output image field 322, which is readily decomposed into segments for rendering. In the difficult case 320, the problem is that given coordinates of a point in the output or target coordinate system, to determine where in the source image 324 that point came from requires solving the inverse of $\vec{P}$. As stated, this is typically much more difficult than the direct application of $\vec{P}$.

Figure 4A:
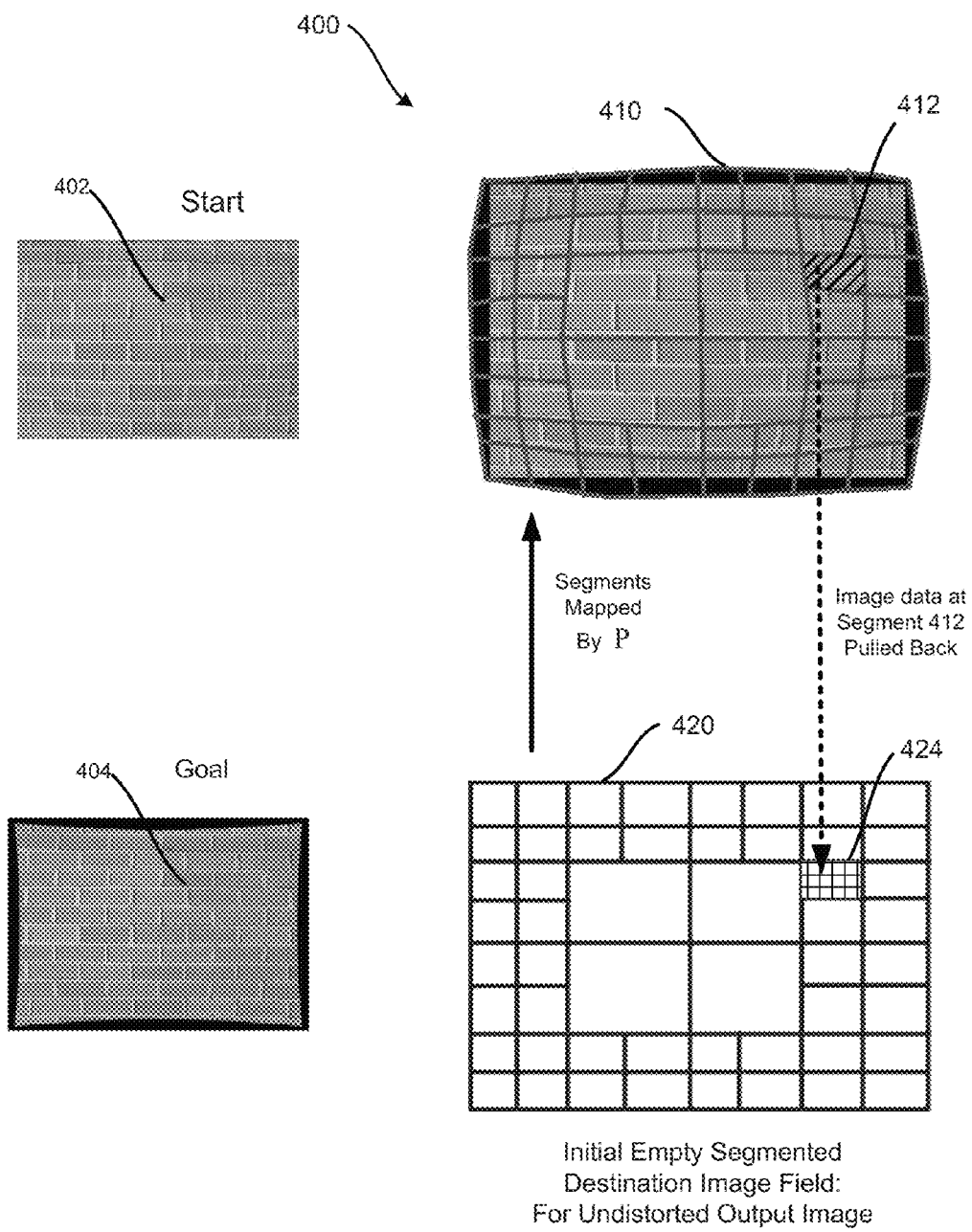
FIG. 4A illustrates a method for correcting distortion in an image.

FIG. 4A illustrates an exemplary method 400 of producing an undistorted output image 404 from a distorted source image 402 having a known distortion. An initially empty output image field 420 (similar to grid 312) is provided for rendering the output image, and the output image field is segmented to a desired resolution. The segmentation may be done using a known coordinate system. In the case shown, the output image field 420 is segmented into rectangular quadrants and subquadrants with respect to a coordinate system with origin at the center of the output image field 420.

Next, in this example, given the coordinates of the corner points of the segment 424 the distortion function $\vec{P}$ is applied to the coordinates to determine a possibly distorted segment 412 in the source image field. Applying $\vec{P}$ to the entire grid of 420 produces a distorted grid 410. The application of $\vec{P}$ to determine the source image segment 412 allows a rendering program, such as OpenGL, to know where to obtain image data from the source image to apply to form the output image. The rendering program thus can take the source image data for segment 412 and map it into output image segment 424. Rendering programs can apply linear interpolation or other processes that effectively undistort the source image's distortion.

Figure 4B:
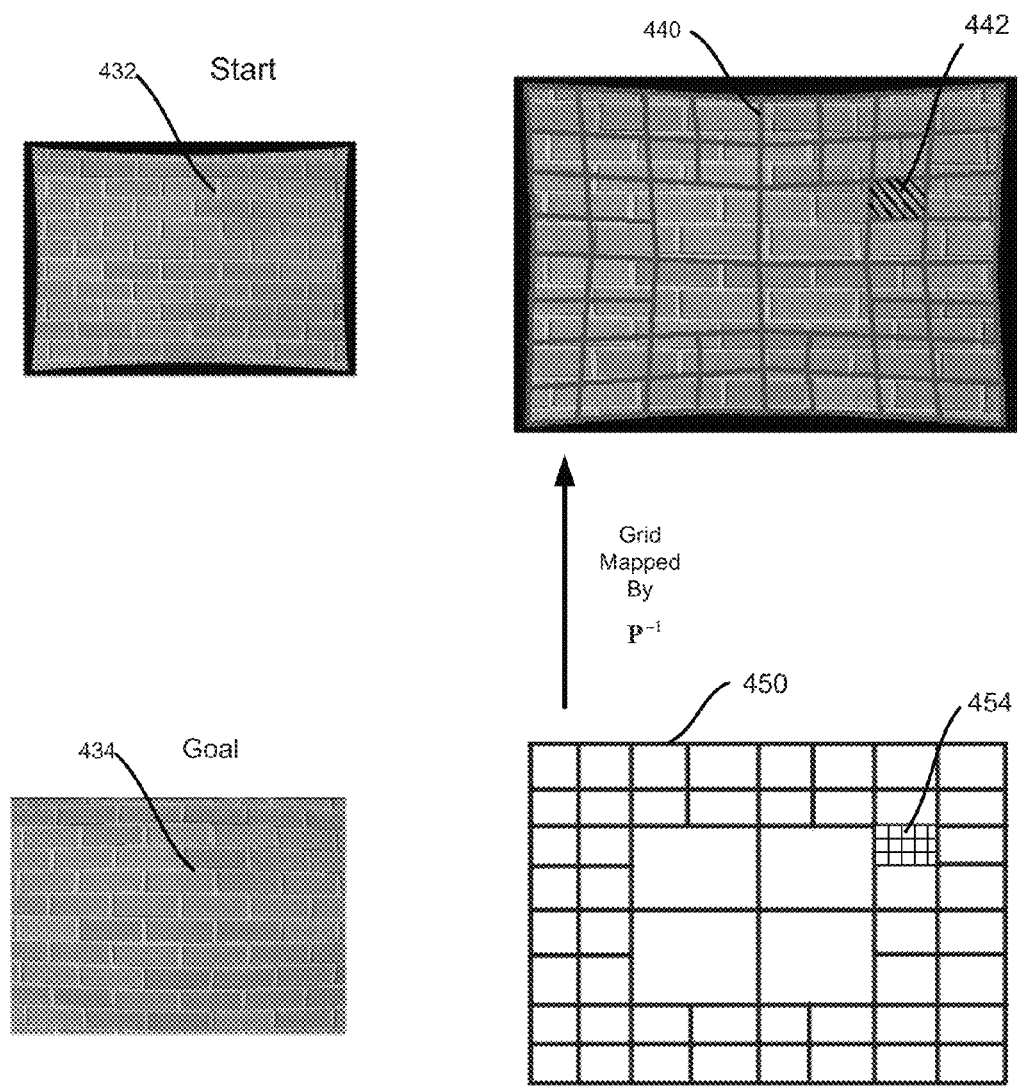
FIG. 4B illustrates a particular method for applying distortion to image data.

FIG. 4B illustrates the difficulty that can arise if the method of FIG. 4A is adapted for applying distortion, rather than correcting it. In this case, one starts with an undistorted source image 432 and seeks the distorted image 434 that would result if the source image was captured by a camera and lens having the known distortion function $\vec{P}$. A segmented grid 450 would be provided for a destination image field (for the distorted output image). However, knowing the coordinates of the corners of the segment 454, it would necessary to apply the unknown $\vec{P}^{-1}$ to determine the corresponding coordinates of the vertices of the segment 442 in the source image. As stated, this can be numerically intensive and time-consuming.

One method for applying distortion could be to take the coordinates of all pixels in a source image, determine the color (or grey scale) value at that pixel, apply $\vec{P}$ to determine the corresponding coordinates of the pixel's location in the distorted image, and apply that color value. However, this method requires calculating $\vec{P}$ at all pixel coordinates.

Embodiments of the present invention are now described that provide methods and systems for applying distortions to source image data. The methods and systems can avoid iterative root-finding operations and applying the distortion function at every pixel's coordinates.

Figure 4C:
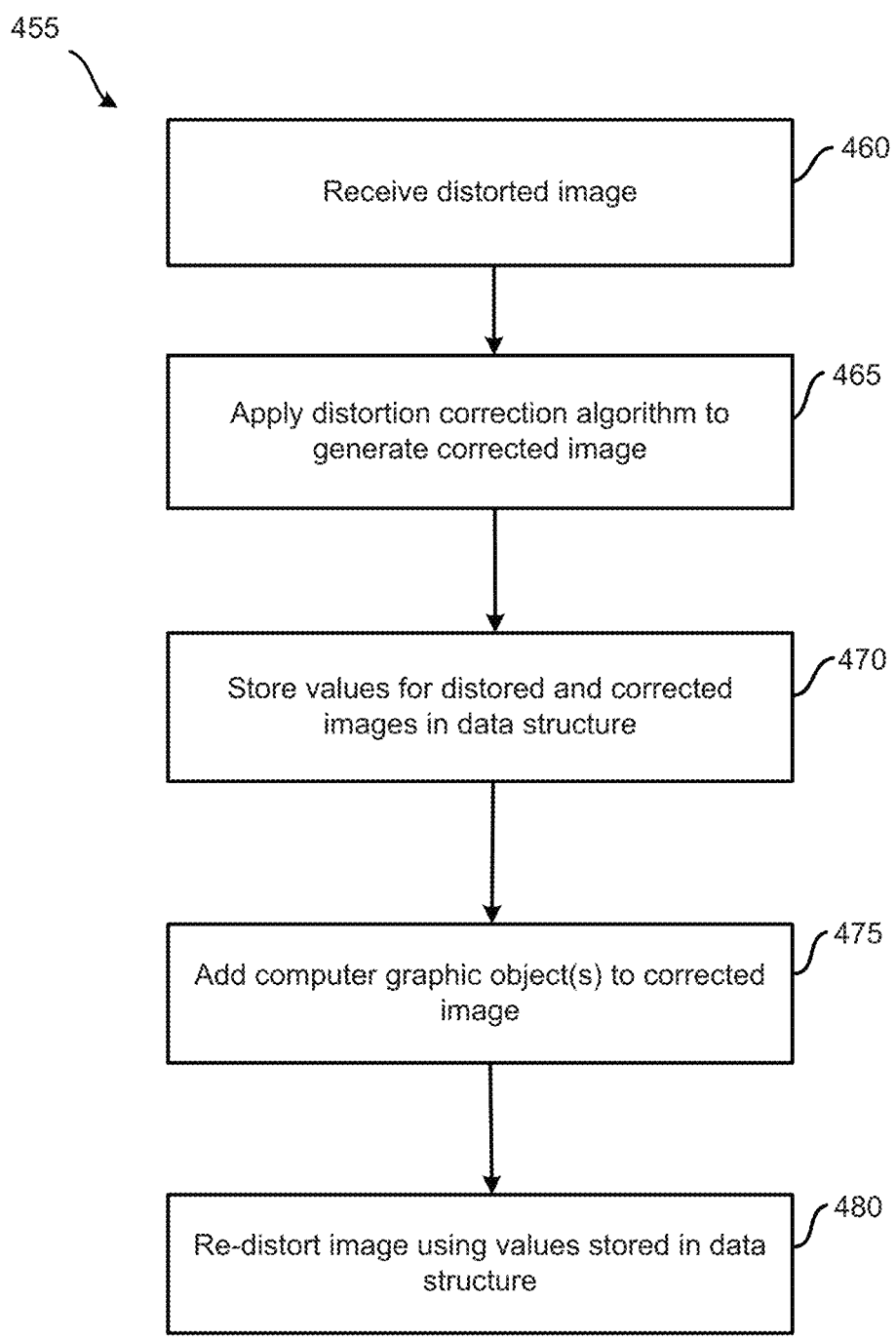
FIG. 4C is a flow chart illustrating one embodiment of the method of the invention.

FIG. 4C is a flow chart illustrating one embodiment of a method 455 according to the invention. As shown in FIG. 4C, a distorted image, captured with a lens that generates distortion in the image, can be received at a processor such as computer system 116 shown in FIG. 1 (step 460). The processor can correct for the distortion by applying a distortion correction algorithm to the distorted image (step 465). As explained above, distortion correction algorithms can be performed relatively efficiently using a reasonable amount of computational resources. Values for the distorted image and corrected image at multiple locations in the image are then stored in a data structure (step 470). For example, in one embodiment the data structure stores a plurality of entries where each entry includes information that identifies a portion of the corrected image, a portion of the distorted image corresponding to the portion of the corrected image, and an approximate inverse function that can be readily calculated to re-distort the portion of the corrected image.

In some embodiments, the approximate inverse function, when restricted to the portion of the corrected and distorted image for which the inverse function is determined, is a linear function. Also, in some embodiments the computational complexity or speed of the approximate inverse function is at most the same order of magnitude as the original distortion correction algorithm. In some particular embodiments described below, the data structure can be a lookup table, and some instances, the lookup table can be a quadtree.

Next, the corrected image can be edited or otherwise processed to add one or more computer graphic objects to the image (step 475) using processor 116 or another processing system. After the editing and/or other processing is completed, a re-distorted image is generated from the corrected image using values stored in the data structure to re-distort the corrected image (step 480). As also explained above, referencing the data structure in this manner to re-distort the image is considerably easier and requires considerably less computational power than solving for lens distortion in the corrected image. Typically, the computer graphic objects applied to the corrected image in step 475 will be undistorted objects that are then distorted in step 480 to the same extent the original image was is re-distorted. Thus, the graphics artist or other technician responsible for the editing process in step 475 can generate accurate work in an undistorted environment and later have the work reproduced in a properly distorted format without requiring the extreme computational resources that would otherwise be required to solve for lens distortion in the previously corrected image. Once the re-distortion process is complete, the image, which may for example be a single frame in a movie clip, may then be combined with other images (e.g., other frames of the movie) that include the original distortion.

Further details of the invention, along with specific embodiments are discussed below after a general discussion on image distortion.

III. Image Distortion

Applying distortion, as would be understood by one of skill in the art, does not necessarily imply exactly calculating a distortion, but distortion only to within a specified or desired accuracy. In the description that follows, it is presumed that a distortion function, such as given in equation (1) from calibrating a camera and lens system, has been determined. This determination may have been performed by lens manufacturer, or may be obtained by a user-performed calibration process, or otherwise obtained.

Various embodiments for applying the distortion may use a data structure termed a segmented rendered distortion image (SRDI). The SRDI comprises a representation of how the known distortion function alters an undistorted initial image field. In some embodiments, it may comprise an image itself; for example, an array of pixel locations and color values, stored according to a known data structure format. The SRDI may also comprise a quadtree data structure that organizes a segmentation of the image. An exemplary embodiment for generation of a SRDI is now described.

Figure 5A:
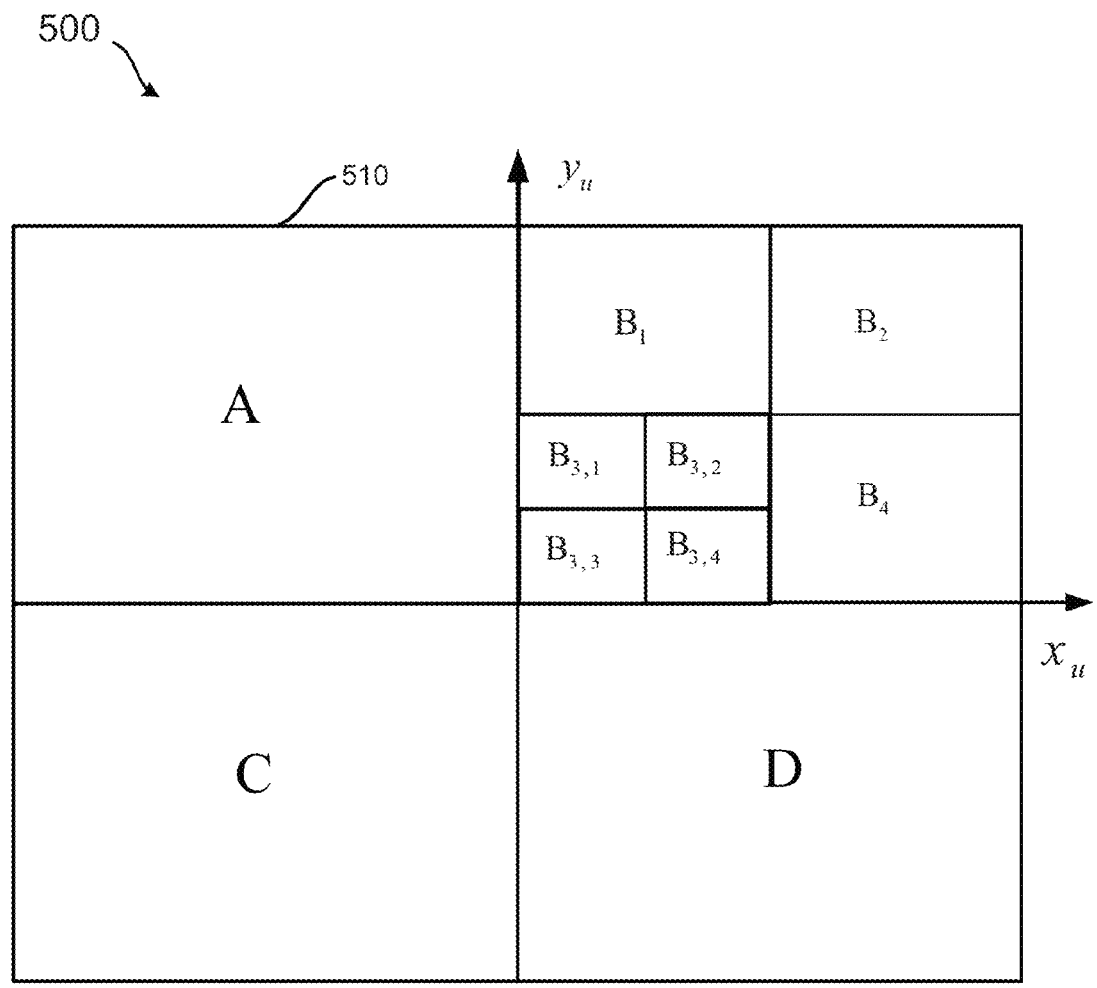
FIG. 5A illustrates generating a segmented image field, according to an embodiment.

FIG. 5A illustrates an exemplary method 500 of segmenting initial image field 510. This segmentation can be stored in a quadtree structure for efficient access, and may be used with the distortion function as part of the generation of the SRDI. In this example, the initial image field 510 is a representation of a rectangular array of pixel locations. The $(x_u, y_u)$-coordinate system used to identify locations in the initial image field is assumed to be the same coordinate system used to express the distortion function in equation (1).

The initial image field is segmented based on the extent of the distortion caused by the distortion function. The segmentation may include recursively subdividing initial segments into smaller segments until on a resulting subdivided segment it is determined that the distortion function has—at least locally to that resulting segment—an approximate inverse function that can be readily calculated. In some aspects, readily calculable approximate inverse functions often have computational complexity or speed at most the same order of magnitude as the original function. In FIG. 5A, the initial image field 510 was initially subdivided into four initial segments: the quadrants, A. C, D, and the upper right quadrant that initially had been labeled B. In the simplified segmentation operation shown in FIG. 5A, the distortion function was determined to have a respective readily calculated approximate inverse function on quadrants A, C, and D.

In one family of embodiments, the distortion function is determined to have a readily calculated approximate inverse function on a segment when the distortion function is determined to be approximately linear when restricted to the segment. The tolerance level for the approximation for this determination can be user supplied. The Jacobian of the distortion function, $J\vec{P}$, evaluated at a corner of a segment, can be used as the local linear approximation to $\vec{P}$. Values of $\vec{P}$ can be computed at points $(x_u,y_u)$ within the segment and compared to the values of $J\vec{P}*(x_u,y_u)^T$. If the differences are within the specified tolerance, the local approximate inverse can then be taken as the inverse matrix $[J\vec{P}]^{-1}$. In some embodiments, the test points $(x_u,y_u)$ lie along edges of the segment and/or at the corners of rectangular segments. In at least one embodiment the specified tolerance can be 1/100 of a pixel, as explained in U.S. Pat. No. 8,446,433.

In other embodiments, different classes of functions can be used from which to select the approximate inverse function. Criteria for selecting categories from which to choose an approximate inverse function may include ease of calculation and resulting number of segments used in the segmentation operation 500.

In the example shown in FIG. 5A, it was determined that on the upper right quadrant B the distortion function did not have a readily determinable approximate inverse function. The quadrant was then subdivided into four smaller quadrants as the new segments: $B_1$, $B_2$, $B_4$ and the lower left smaller quadrant, initially enumerated $B_3$. On each of $B_1$, $B_2$, $B_4$ it was determined that the distortion function had a readily calculable approximate inverse function. However, on $B_3$ it was determined that the distortion function did not have a readily calculable approximate inverse function. So $B_3$ was further subdivided into four even smaller quadrants: $B_{3,1}$, $B_{3,2}$, $B_{3,3}$, and $B_{3,4}$. At this stage in the exemplary segmentation shown in FIG. 5A the distortion function was determined to have readily calculable approximate inverse functions for each new segment, and the segmentation operation terminated. Thus the initial image field 510 has been decomposed as a disjoint union of a total of ten segments (i.e., quadrants or subquadrants) with each segment being associated with an approximate inverse function that was specifically calculated for that segment.

In applications it may be the case that the number of segments at the end of the segmentation process 500 is significantly less than the total number of pixels in the initial image field. The segments resulting from the segmentation operation on initial image field can be enumerated with a unique value for that segment. This unique enumeration value for the segment can be associated with each pixel coordinate $(x_u,y_u)$ in the segment. The unique enumeration of the segments may be a color value, such as a grayscale value, an RGBα value, or a value from another image format.

In additional and/or alternative embodiments that use local linear approximations of the distortion function, with their inverses thereof as the readily calculable approximate inverse functions, the four components of the matrix of an inverse may be used directly to form a color value for the segment. For example, if using floating point real numbers (floats) for the matrix of the inverse, the four floats can be used to form an RGBα color value, which is used as the enumeration value of the segment and/or a color value for the pixels therein. In these embodiments the enumeration values of segments need not be unique. When such a segment is accessed, its color can be obtained and the readily calculable approximate inverse function can be immediately read off from the color value itself.

As mentioned earlier, the distortion function $\vec{P}$ can be directly computed. It may now be computed for at least the pixel coordinates of corners of the initial segments of the initial image field to produce a set of distorted locations spanning a reference image field for the SRDI.

Figure 5B:
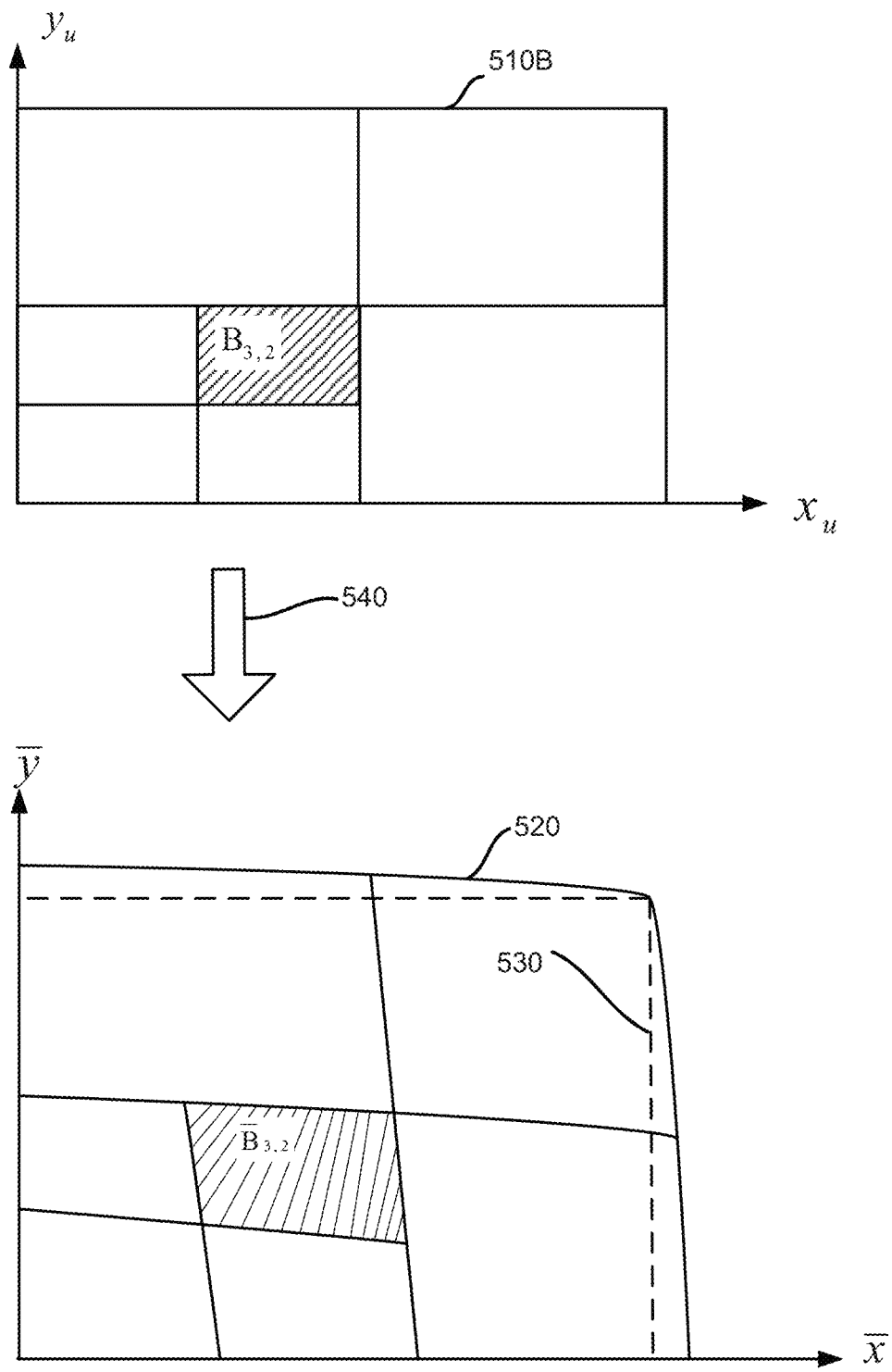
FIG. 5B illustrates generating a distorted segmented image field, according to an embodiment.

FIG. 5B illustrates this application of $\vec{P}$ to the upper right quadrant 510B of the segmentation of the initial image field shown in FIG. 5A. In particular, the pixel or coordinate locations initially in the segment $B_{3,2}$ are mapped 540 by $\vec{P}$ onto distorted coordinates with respect to the $(\bar{x},\bar{y})$-coordinate system which cover the shown output area $\bar{B}_{3,2}$. In some embodiments $\vec{P}$ is only applied to the corners of $B_{3,2}$ and the output area $\bar{B}_{3,2}$ is completed by linear interpolation. Such output areas produced by applying $\vec{P}$ to a segment produced by the segmentation of the initial image field are termed reference segments. The segments of the initial image field are herein termed either segments or initial segments as needed to aid clarity. The mapping 540 may assign to reference segment $\bar{B}_{3,2}$ the enumeration value that had been assigned to $B_{3,2}$. The enumeration's value may be assigned to the coordinate locations within $\bar{B}_{3,2}$.

The $(\bar{x},\bar{y})$-coordinate system may be used as a coordinate system for the SRDI. The camera and lens system may capture an image within a capture image field 530. In some cases the mapping 540 may evaluate pixel or coordinate locations of the segmented initial image field to locations that lie outside of reference image field 530, as shown by the arc 520. In still other cases the mapped locations may lie entirely in the reference image field.

The result of the mapping 540 is to produce output coordinate locations and a distorted output segmentation of the reference image field 530 into reference segments, wherein each output coordinate location, with respect to the $(\bar{x},\bar{y})$-coordinate system, nevertheless retains the associated enumeration value corresponding to its source segment in the initial image field. This data is stored as the segmented rendered distortion image (SRDI). In some embodiments the SRDI may also comprise other data. In some aspects, if the mapping 540 moves a segment of the initial image field to lie completely outside of the reference image field, the data for that distorted segment need not be included in the SRDI.

In some embodiments that use a color value as the unique enumeration of the segments of the initial image field, the mapping 540 may be used to color an array of pixels on the reference image field 530. For example, all pixels in the reference segment $\bar{B}_{3,2}$ are given the unique color that was used to enumerate $B_{3,2}$. This could be the result of assigning the unique enumeration color value for $B_{3,2}$ to all $(x_u,y_u)$-coordinate locations in $B_{3,2}$, then applying $\vec{P}$ to all the $(x_u,y_u)$-coordinate locations of $B_{3,2}$ and assigning that enumeration color to the resulting output $(\bar{x},\bar{y})$-coordinate locations. The colors may then be rendered to produce a new image. The new image so produced is a component of the resulting SRDI data structure in these embodiments. In these embodiments the SRDI could comprise a data structure and memory for a single image (in the chosen color format).

Once generated, the SRDI data structure may be cached for use in applying distortion within multiple images. Other data may be cached as part of it, such as data for the distortion function and for the local approximate inverse functions. For example, a portion of the SRDI data structure can be represented as an image formed from the color values assigned to each pixel (as shown below in FIGS. 5C and 5D). Each pixel in the SRDI image can map to a pixel in the corrected image where the pixel is assigned a color value according to the segment of the image it falls within. The color value can then be used, within the SRDI, to lookup the approximate inverse function calculated for that segment, and that approximate inverse function can then be used to re-distort the corrected image at the location of the particular pixel.

Figure 5C:
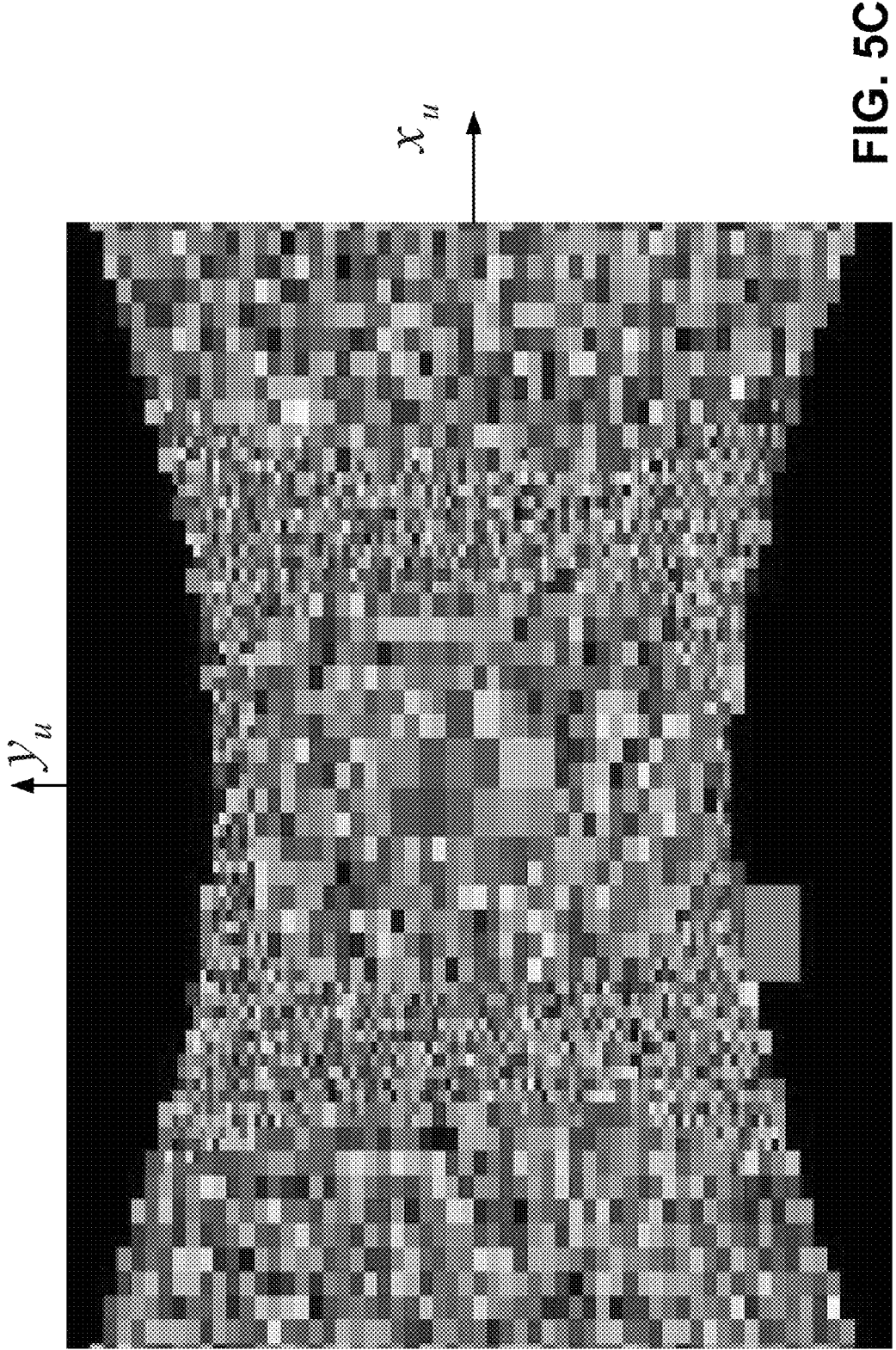
FIG. 5C illustrates an undistorted image field, according to an embodiment.

FIG. 5C shows a more complicated segmented initial image field than that of FIG. 5A. The enumeration values in this example are provided by unique RGBα values assigned to each rectangular segment. The gray scale or RGBα values chosen for the rectangular segments are all distinct, though some may appear similar in color, and were randomly generated. Initial segments that would be mapped outside the reference image field are not shown.

Figure 5D:
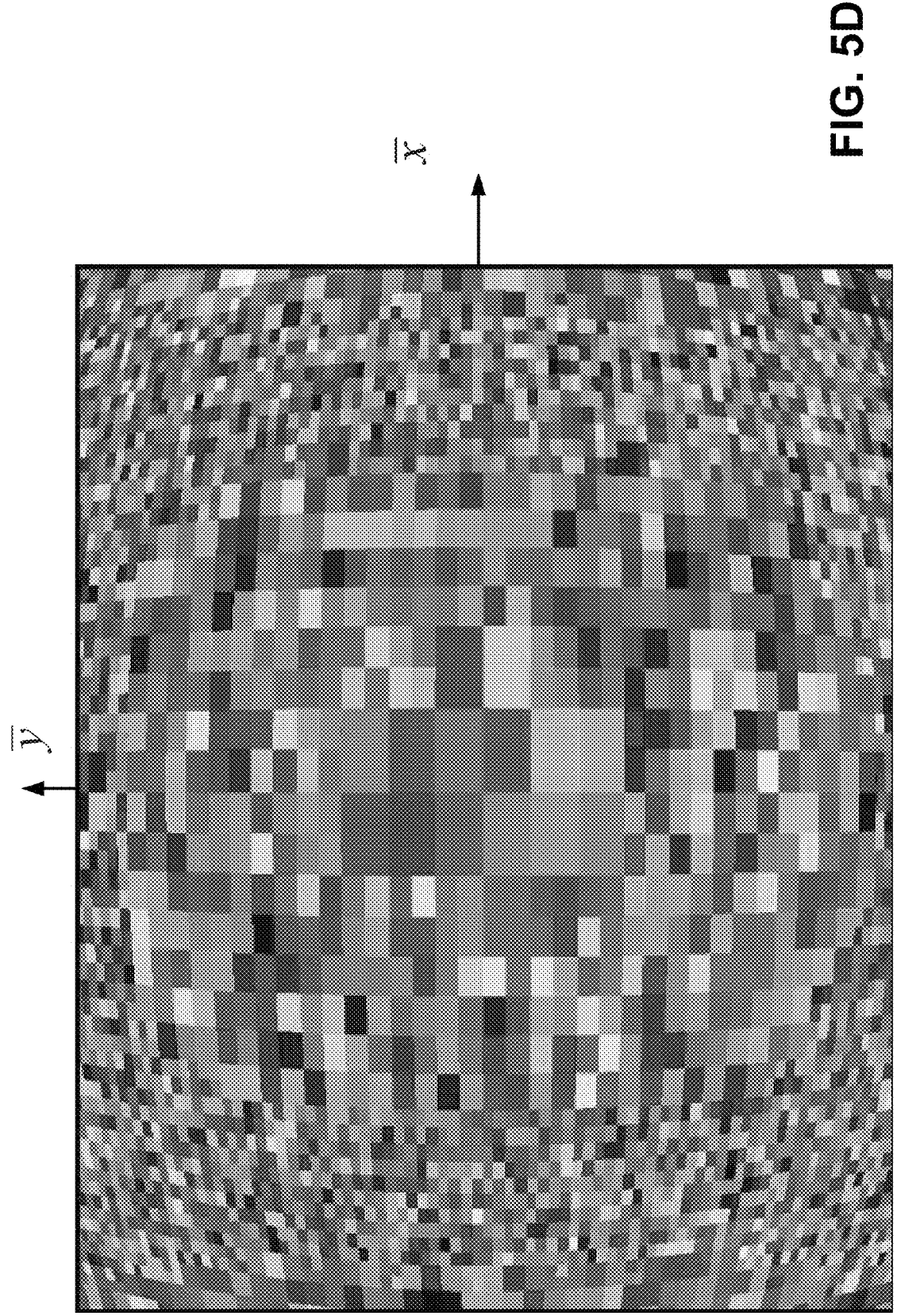
FIG. 5D illustrates an distorted image field, according to an embodiment.

FIG. 5D shows the SRDI resulting from using a barrel distortion function on the segmented initial image field of FIG. 5C. The two figures show that the distortion is greater in an annulus about the optical axis (which passes through the origin of the $(x_u,y_u)$- and $(\bar{x},\bar{y})$-coordinate systems), so the segmentation uses a finer resolution there to reference the more rapid change in the distortion function. In this embodiment, the SRDI comprises a color image, the color of each distorted segment in the SRDI being the same color of the source segment, and serving as the enumeration value.

Figure 6:
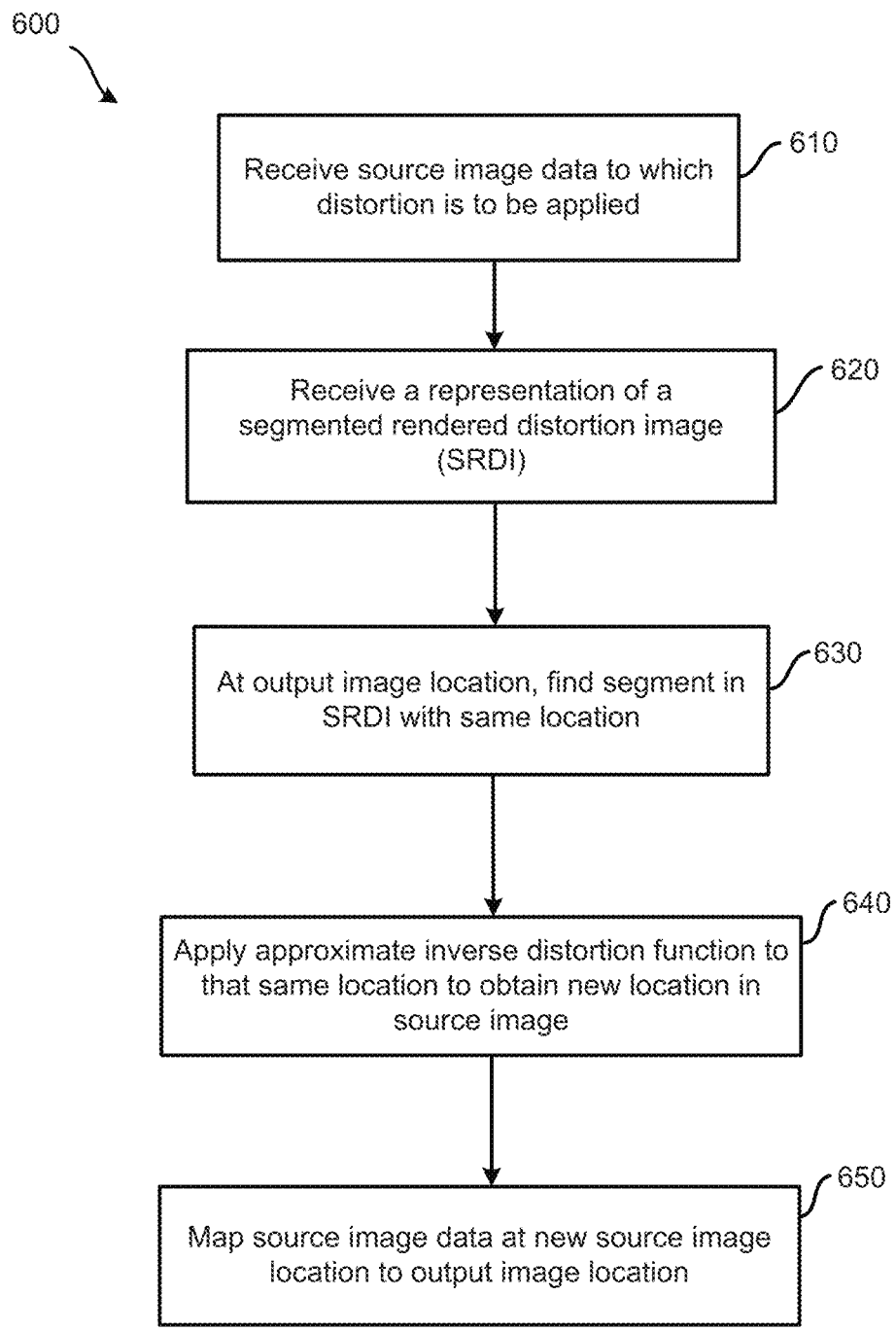
FIG. 6 is a flow chart of another method for applying distortion to image data, according to an embodiment.

FIG. 6 is a flow chart of an embodiment of a method 600 for applying distortion to source image data of a source image. The method 600 begins at stage 610 with the reception, such as at a computer system 116, of source image data. It is assumed that the distortion function such as in equation (1) has been determined.

The information received at stage 610 can include information of the dimensions of the pixel array, coordinate system location, and other information. The method 600 may also receive information regarding the distortion function given as in equation (1). As previously stated, the functions can be polynomial, rational, algebraic, or other calculable expressions.

At the stage 620 the computer system receives as an input a representation of the SRDI, generated as described above. The representation may be as an RGBα color image as described above, or as another data structure.

At stage 630, generation of image data for a distorted output image proceeds by taking an initial location of a component of the image field for the output image. The initial location can be the coordinates of a pixel location in the output image field, such as at a corner of a rectangle of a segmentation of the output image field. This initial location is then taken as the same location within the SRDI. The reference segment of the SRDI that contains that initial location is then determined. In the embodiment that the SRDI is implemented as a rendered image, the color value of the location is simply read from the SRDI. Next, the enumeration value for that segment in the SRDI is determined. In some embodiments a previously generated Lookup Table (LUT) that matches the enumeration values to reference segments may be used to make the determination. In the example shown in FIG. 3D, the color value of a location in FIG. 3D provides the enumeration value.

At stage 640, knowing the enumeration value for the reference segment, data for the local inverse of the distortion function for that reference segment is then accessed and applied to the initial location to calculate a new position in the source image. By the way the SRDI was generated, the local inverse function for the distortion function for the reference segment has a readily calculable form for locations (e.g., pixel coordinates) within that reference segment. In the embodiments in which the segmentation of the initial image field is continued during SRDI generation until the distortion function is approximately linear to within a given tolerance, the local inverse function may be chosen as the matrix inverse of the linear function approximating the distortion function.

At stage 650 image data from the source image corresponding to the calculated new position is mapped back to the output image field at the initial location as part of generating the distorted output image. The mapping may be done by a rendering program. In one aspect, four initial corners of an initial segment in an initially empty output image field may each be mapped, as above, into the SRDI, and then by respective local inverse functions to specify an area within the source image. The image data for that area may then be applied to the initial segment in the output image field. The mapping may be by a rendering program. The image data may make use of textures.

Figure 7:
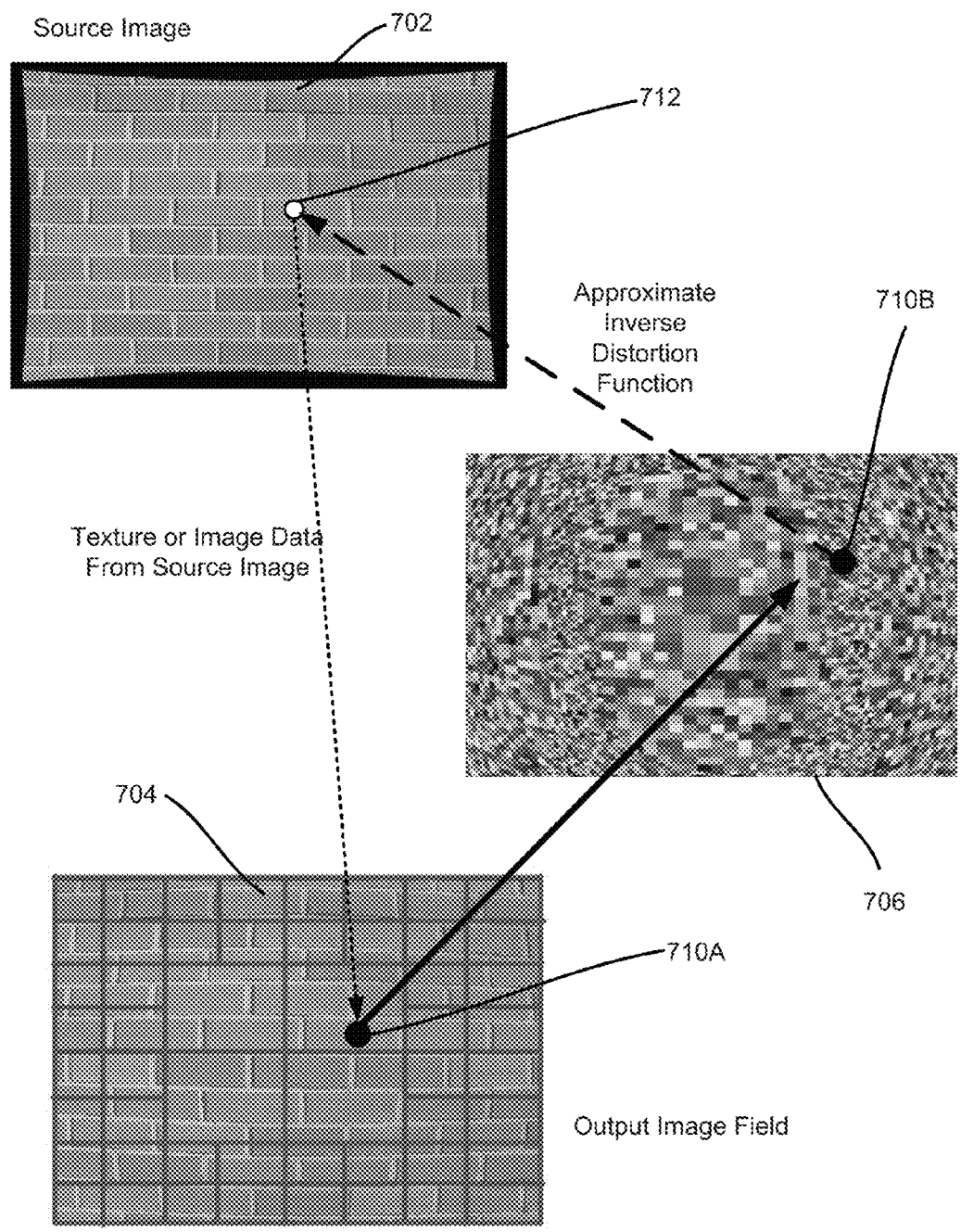
FIG. 7 illustrates a method of applying distortion using a segmented rendered distortion image, according to an embodiment.

FIG. 7 pictorially illustrates an embodiment of the operations described for stages 630 through 650 of the method 600. A distortion is to be applied to a source image 702 to generate a distorted output image 704. An initial location 710A within the initially empty output image field is selected. In this example the initial location may be the coordinates of a pixel, such as a corner of an initial segment. In this example, the coordinates of the point 710A are denoted (a,b). These coordinates then locate a point 710B within the SRDI 706. The segment in the SRDI containing (a,b) is then determined. The corresponding enumeration value of the segment is also determined. In the example shown in FIG. 7, point 710B in the SRDI is determined to have a specific, unique color, which serves as the enumeration value. Using the enumeration value, data for the local approximate inverse of the distortion function for segment is accessed and applied to (a,b) to produce a point 712 in the source image field, whose coordinates are denoted $(\alpha,\beta)$ in this example.

Image data from the source image corresponding to the point 712 is now applied, e.g., by a rendering program, to produce image data for the output image at the point 710A, as explained above. The mathematics of this example is that by locating (a,b) in the SRDI and then applying a local inverse to (a,b), one is effectively calculating: $(\alpha,\beta)^T = P^{-1}((a,b)^T)$ without the computational expense of exactly calculating $P^{-1}$. Thus at (a,b) in the output image the method has placed the image data that had been, in the source image, at $(\alpha,\beta)$:, $$\text{i.e. } \begin{pmatrix} a \\ b \end{pmatrix} = P\begin{pmatrix} \alpha \\ \beta \end{pmatrix},$$

which is applying the known distortion function to the source image.

IV. Generation and Storage of Segmented Rendered Distortion Images

Other aspects of additional and/or alternative embodiments include ways for efficiently generating, storing and retrieving data of an SRDI. Some embodiments make use of a quadtree data structure for these operations, as now described.

Figure 8A:
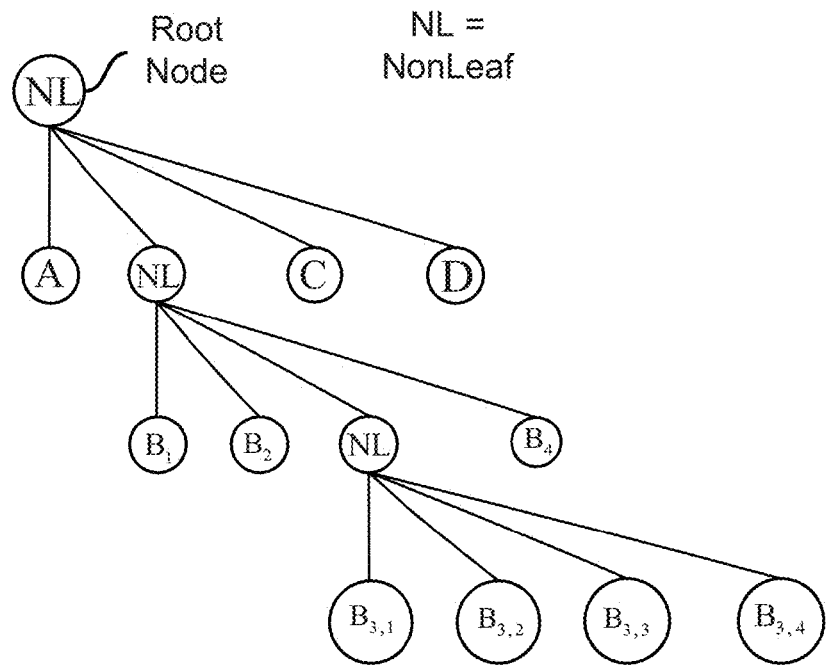
FIG. 8A illustrates a quadtree data structure, as used in an embodiment.

FIG. 8A illustrates a quadtree data structure that can be used for generating, organizing and storing information regarding an image. The quadtree 802 has the graph theory structure of a rooted tree, in that there are a set of edges and a set of vertices (also called nodes) such that any two vertices are connected by exactly one path, and there is a particular vertex, called the root, and a partial ordering, or hierarchy, to the nodes. A leaf is a vertex of degree 1, and is such that no vertex is less than it with respect to the partial order; this is also expressed as a leaf has no child nodes. In a quadtree, any node that is not a leaf has exactly four nodes as child nodes. Other graph theoretic properties of trees will be known one of skill in the art.

The quadtree 802 can be used to store data corresponding to the segmented initial field of FIG. 5A. The leaf nodes correspond respectively to the segments A, C, D, $B_1$, $B_2$, $B_4$, $B_{3,1}$, $B_{3,2}$, $B_{3,3}$, and $B_{3,4}$. The nodes of a quadtree can be ordered recursively, and this can provide an effective means for storage and access of hierarchical information in a computer system. The ordering of the quadtree 802 is shown in 812. The generation of the recursive ordered listing of nodes starts with the root node. Each of its four child nodes is then tested to determine if it is a leaf node. If it is a leaf node it is appended to the ordered list. If it is not a leaf node, an entry indicating a non-leaf node, NL, is appended to the list, and then its four child nodes are tested similarly in sequence. For the graphically displayed quadtree 802, the resulting ordered list is 814. Within a computer system the visually displayed quadtree structure 802 is inherent in the sequential listing of nonleaf and leaf nodes.

For the application of a quadtree to storing segmentation information of an initial image field, such as initial image field 510 of FIG. 5A, one can use as an order on the four segments from a segment subdivision (equivalent to an ordering of the four child nodes of non-leaf node) by: upper left, upper right, lower left, and lower right. This is shown by the alphabetical and numerical listing of the segments in image field 510.

The ordered list of the nodes of a quadtree can provide an enumeration of either all the nodes of a quadtree, or an enumeration of just the leaf nodes of a quadtree. Using the ordering 812, an enumeration of the leaf nodes of quadtree 802 is given by 814. The ordered list of the nodes in a quadtree can be used to provide a means for recording information of an SRDI: the leaves of a quadtree can have one-to-one and onto correspondence with the segments of the SRDI. The leaves can themselves be data structures for storing information regarding the segment, such as information regarding the calculable approximate inverse of the distortion function for that segment.

It will be apparent to one of skill in the art that the segmentation of an initial image field and use of a quadtree data structure for storage and organization does not depend on using a rectangular coordinate system for referencing points of an initial image field. For example, if an initial image field is a disk, and if it is known that the distortion function is much more dependent on the radial distance r from the lens axis rather than horizontal or vertical locations, then use of a polar coordinate system may be more appropriate. Similarly, other coordinate systems, such as parabolic coordinates, may be used.

Figure 8B:
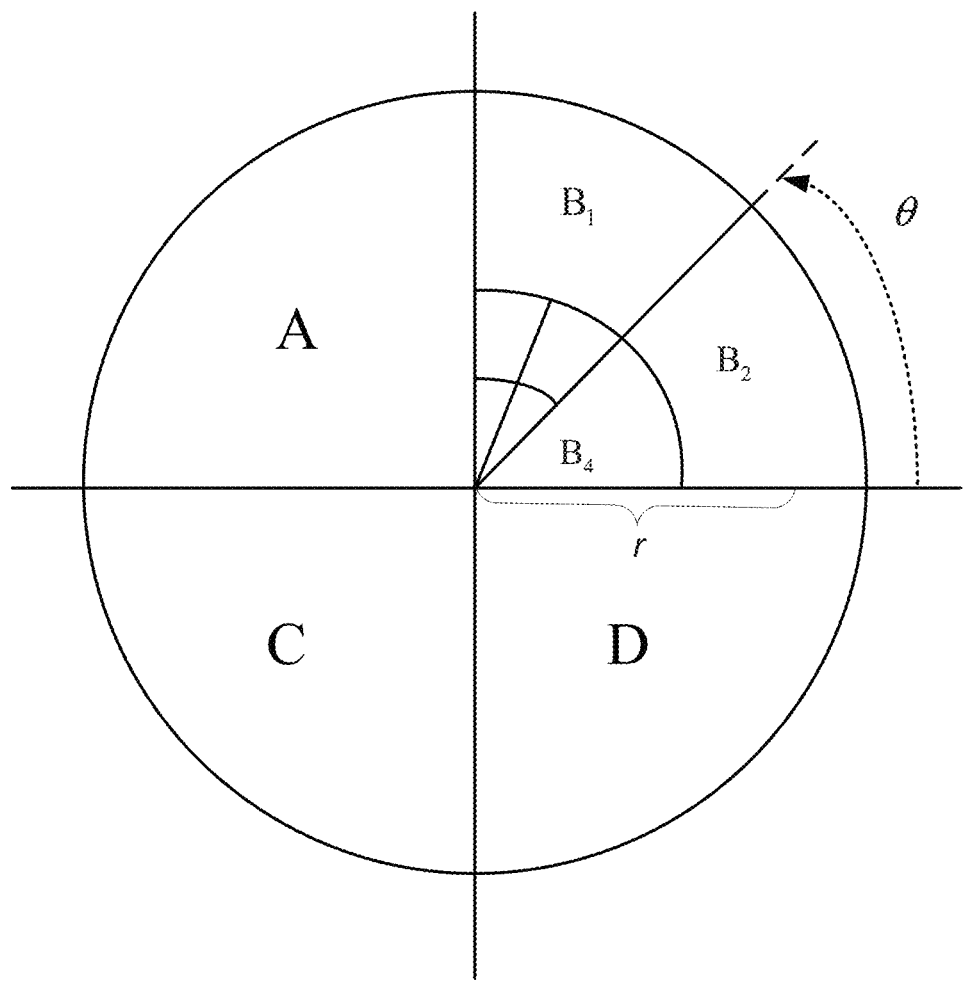
FIG. 8B illustrates a segmentation of an initial image field specified using polar coordinates, according to an embodiment.

FIG. 8B illustrates one way that the recursive segmentation and use of a quadtree data structure could be applied with an image field that is referenced using a polar coordinate system. The field is initially split into four quadrants, i.e. $k\frac{\pi}{2} \leq \theta < (k+1)\frac{\pi}{2}$, k=0 ... 3, and thereafter each segment is bisected in both θ and r, in analogy with the bisection with respect to x and y for rectangular coordinate systems.

Figure 9:
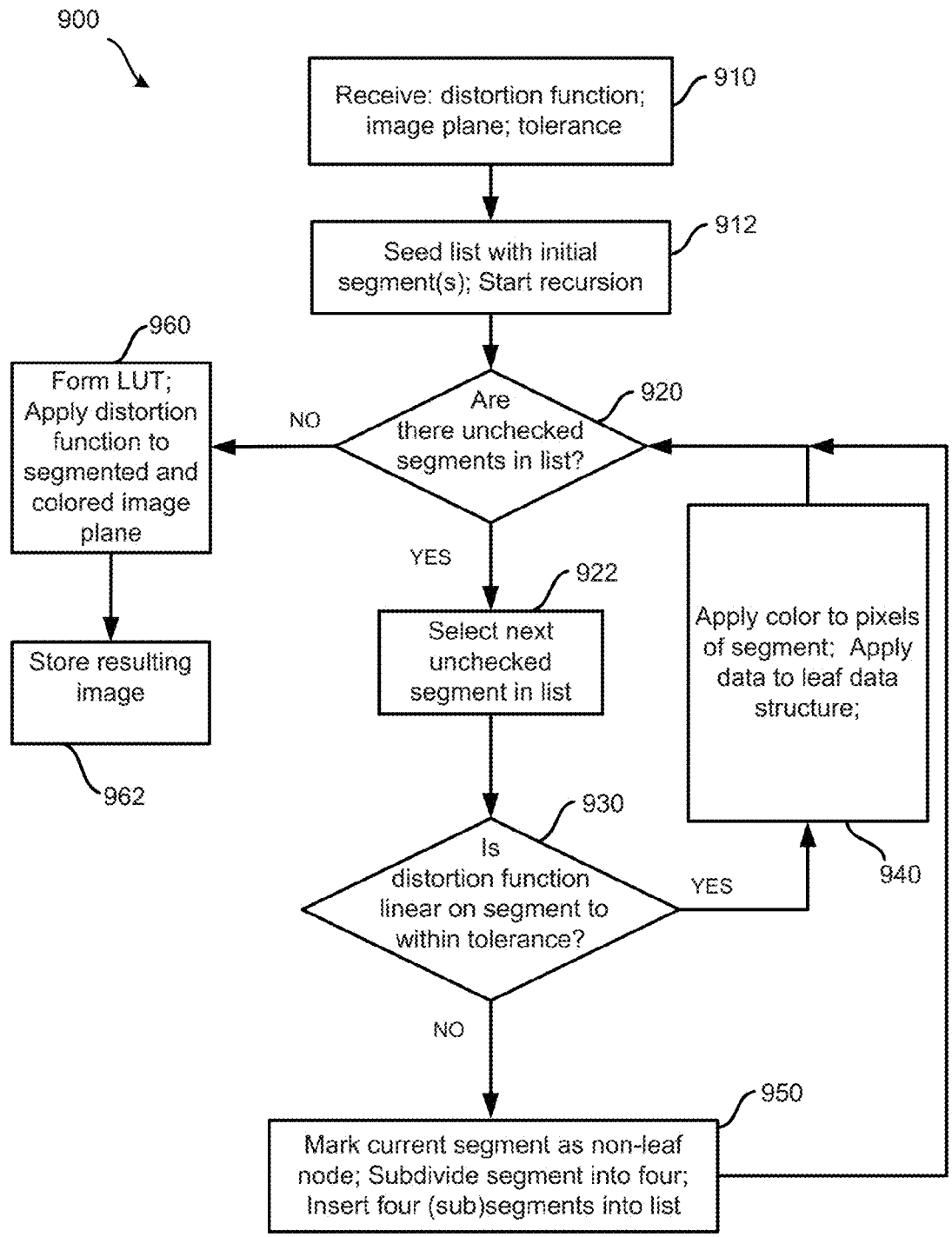
FIG. 9 is flow chart of a method for generating a segmented rendered distortion image, according to an embodiment.

FIG. 9 is a flow chart of an embodiment for producing a SRDI using a quadtree data structure. At stage 910 a computer system can receive information regarding the known distortion function for the camera and lens system to be used, information regarding the initial image plane (such as the number of pixels in each dimension, coordinate system and origin, or other information) and a tolerance (or a plurality of tolerances) representing desired accuracy to use for approximating the distortion function or its inverse. Other information may also be included with the initial inputs.

At stage 912, a quadtree data structure is seeded with an initial segment. Often this initial segment is the initial image field itself. Alternatively, to reduce preliminary recursion steps, the initial image field may be initially subdivided, for example into quadrants A, B, C and D as in FIG. 5A, and the quadtree data structure initially seeded with the initial segments.

At stage 920 the recursion proceeds by determining if an unchecked segment occurs in the list of segments. In the case of a root node as the initial seed, it is initially unchecked. At stage 922 the recursion selects the next unchecked segment in the list.

At stage 930 the segment is tested to determine if the distortion function on the segment has a calculable approximate inverse. In the exemplary embodiment of FIG. 9, a linear approximation is the desired approximate form of the distortion function, and so also of its inverse. The determination is whether the distortion function is accurate to within the input tolerance of a linear approximation. If the Jacobian of $\vec{P}$ is to be used as the linear approximation of $\vec{P}$, and for $(x_0,y_0)$ a corner of the segment, the test can be expressed as $$JP * \begin{pmatrix} \Delta x \\ \Delta y \end{pmatrix} \approx P\begin{pmatrix} x_0 + \Delta x \\ y_0 + \Delta y \end{pmatrix} - P\begin{pmatrix} x_0 \\ y_0 \end{pmatrix},$$

where the approximation is to be within the given tolerance. The test can be performed for a plurality of points $(x_0,y_0)$ within the segment to ensure the approximation is valid. Tests based on second derivatives of $\vec{P}$ may also be used to determine that distortion function is approximately linear on the segment.

If the approximation is determined to be valid on the segment, the recursion proceeds at stage 940 to mark the segment as a leaf, to assign a color to the pixels of the segment, and to assign data related to the calculable approximate distortion function, which in this embodiment can be the coefficients the matrix $[JP]^{-1}$. Other information may also be included in the data fields of the leaf node. The color in this embodiment serves as the enumeration value used to identify the segment uniquely. A unique color is used to for each segment. The color system used may be gray scale values, RGBα, or other color systems. Enumerations other than by color may also be used.

If alternatively the approximation is determined not to hold, the recursion proceeds at stage 950 to mark the current segment as a (checked) non-leaf node, subdivides the segment into four quadrants, and inserts the four quadrants as (unchecked) segments in the list after the non-leaf current segment.

Once there are no unchecked segments in the list, it follows that the nodes of the quadtree are either non-leaf nodes, or colored leaf nodes. The process 900 then, at stage 960, can include the formation of a look-up table (LUT) that gives the correspondence between the color assigned to a segment and the entry of the segment in the ordered listing of the quadtree. Also at stage 960 the distortion function is applied to the colored initial image field to produce a new image, the SRDI.

At stage 962, the process 900 concludes by storing the SRDI. The SRDI may be stored using various encoding formats, such as JPEG, gif or another format. The choice of format may be chosen based on the capabilities of the computer system.

As described below, in various embodiments an SRDI is used to apply a known distortion to an image. However, it would be clear to one of skill in the art that the process just described may be used for image correction. During the process 900, the original image plane, corresponding to an undistorted image, is decomposed into segments (e.g. rectangles) on which the distortion function is approximately linear. Those segments may be mapped by the distortion function P to form a distorted image plane decomposed into distorted segments. For distortion correction, when a distorted image is received, the distorted image plane can be overlain on the received distorted image, and a mapping or rendering program may map the image content within a distorted segment onto the corresponding segment of the original image plane.

V. Applying Distortion Using Segmented Rendered Distortion Image and LUT

Figure 10:
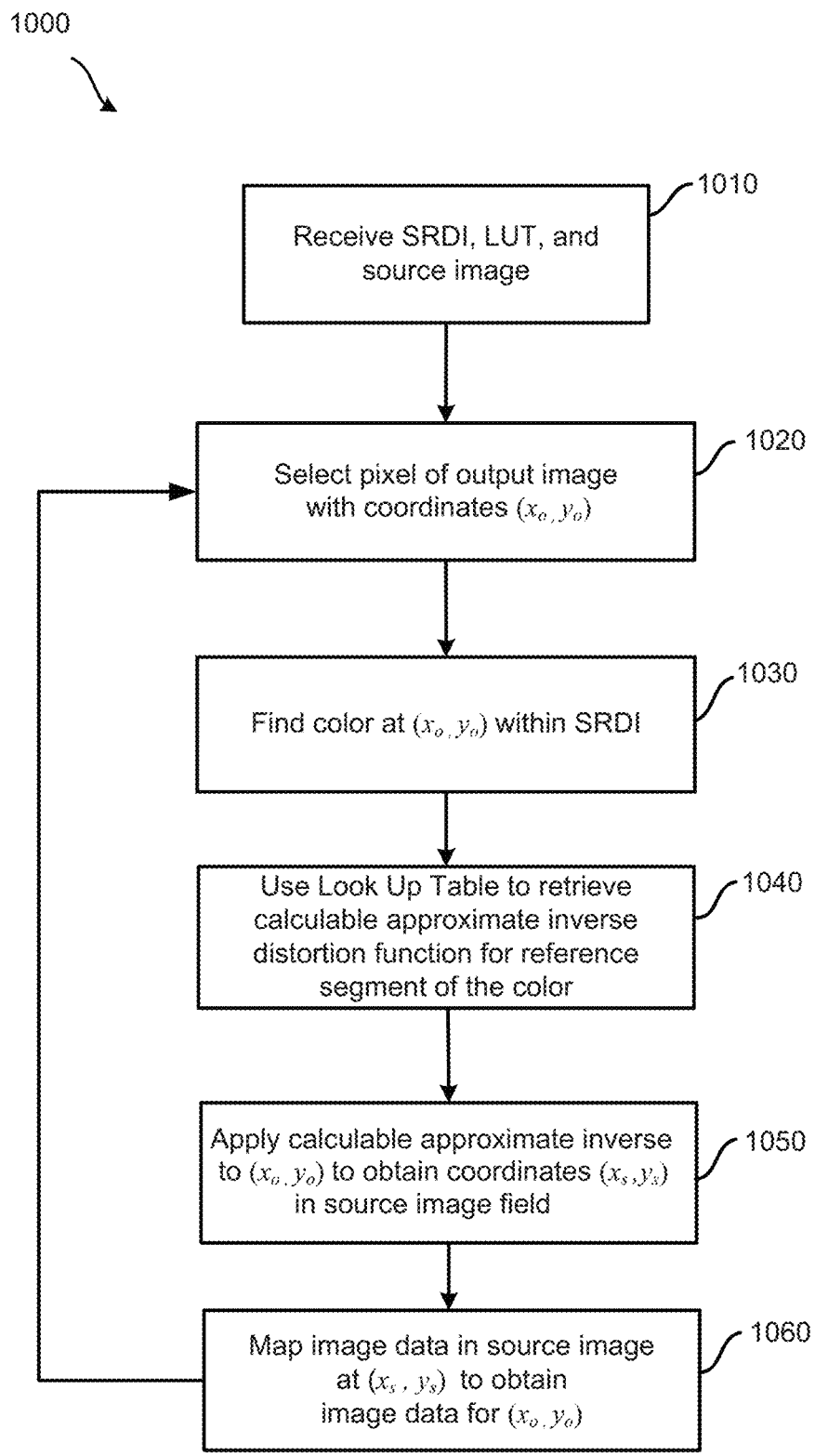
FIG. 10 is a flow chart of a method of applying distortion to image data, according to an embodiment.

FIG. 10 is a flow chart of an exemplary method 1000 that uses an SRDI, together with a LUT, to apply a known distortion function to a source image to produce output image data. The method 1000 begins at stage 1010 with a computer system obtaining data of a source image, the representation of the SRDI and the corresponding LUT. Other information as needed is also obtained.

At stage 1020 a pixel is selected at a location $(x_o, y_o)$ in the coordinate system of the output image field. In some embodiments, a component of the output image field comprising more than one pixel may be located.

At stage 1030 the color of the pixel at location $(x_o, y_o)$ in the SRDI is determined. This can be a simple reading of the color from the format in which the SRDI was stored.

At stage 1040, the color value is used with the LUT to determine the corresponding segment data. The segment corresponds to a leaf of the quadtree representing the SRDI, and can comprise fields of information for the segment, such as corner locations of the segment, as well as information regarding the calculable approximate inverse function of that segment (e.g., the matrix entries of an inverse of a linear approximation of the distortion function).

At stage 1050 the calculable approximate inverse function for that segment is applied to $(x_o, y_o)$ to obtain the coordinates of a location of a pixel $(x_s, y_s)$ in the coordinate system of the source image. The process may be repeated to obtain a sufficient quantity of pixel locations in the source image so that source image data corresponding to $(x_s, y_s)$ can be obtained. For example, four pixel locations in the source image corresponding to four corners of a segment in the output image field may be obtained.

At stage 1060 image data of the source image corresponding to the location $(x_s, y_s)$ is used to produce image data for the output image at the location $(x_o, y_o)$. In an embodiment the location $(x_o, y_o)$ is one of four corners of a segment in the output image field. Four corresponding locations of a modified segment in the source image field are obtained, and image data for the modified segment is mapped to the segment in the output image field. The mapped image data may comprise textures or other image data known in the art.

The procedure may be iterated and/or applied throughout the output image field to generate image data for a complete output image that approximates the result of applying the distortion to source image. While the exemplary method 1000 was described with respect to pixel locations, it will be apparent to one of skill in the art that other embodiments may use other ways of referencing locations in the output image field, the SRDI and the source image.

VI. Computer System Implementations

Figure 11:
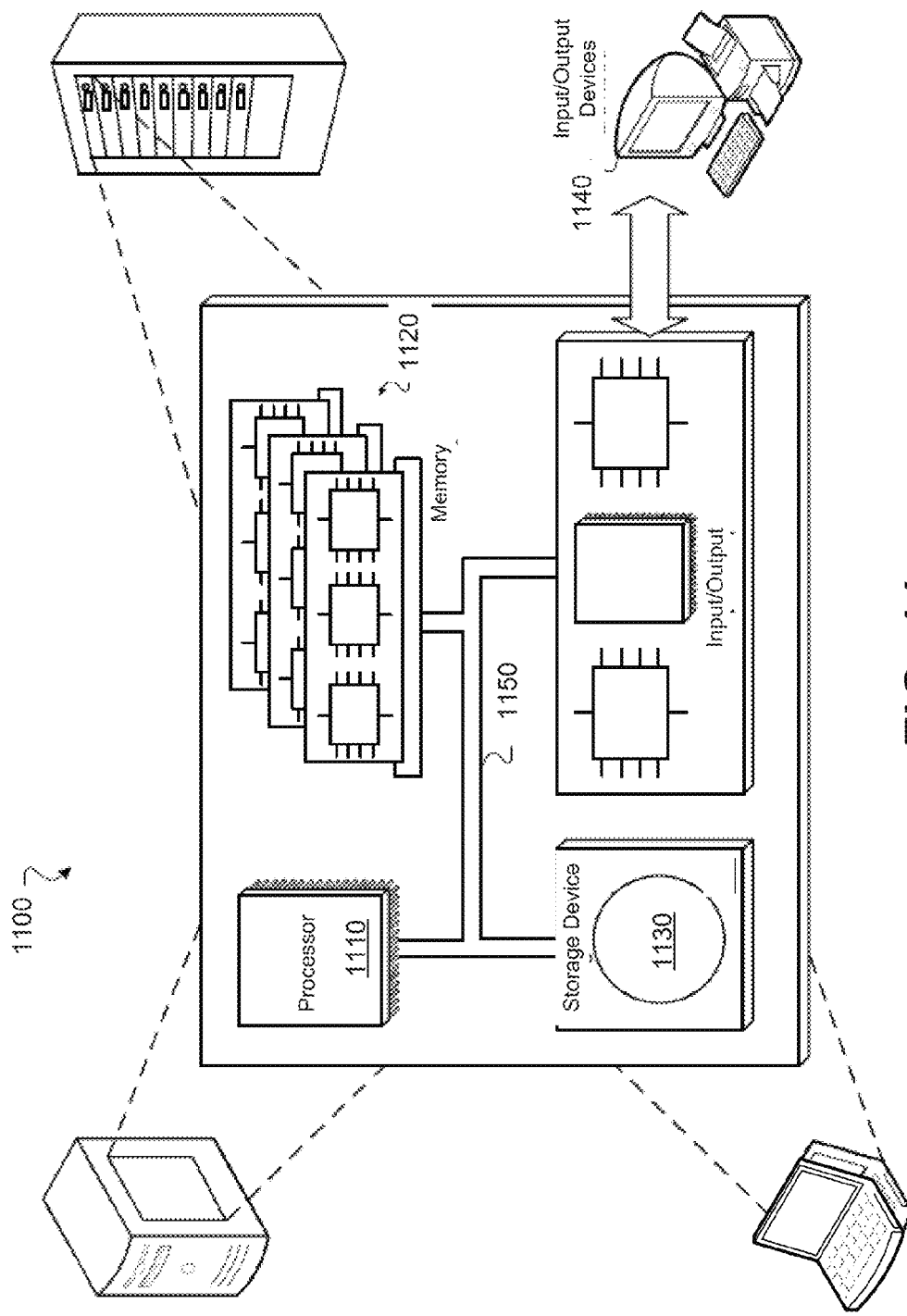
FIG. 11 illustrates a computer system.

FIG. 11 is a schematic diagram of a generic computer system 1100. The system 1100 can be used for the operations described in association with any of the computer-implement methods described previously, according to one implementation. The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 may be a floppy disk device, a thumb drive, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user, and a keyboard, touchpad or a pointing device such as a mouse, stylus, or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them.

The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

CONCLUSION

A number of embodiments have been described. As will be understood by those skilled in the art, the present invention may be embodied in other specific forms without departing from the essential characteristics thereof. Those skilled in the art will recognize, or be able to ascertain using no more than routine experimentation, many equivalents to the specific embodiments of the invention described herein. Such equivalents are intended to be encompassed by the following claims.

What is claimed is:

1. A method of processing an image, the method comprising:
receiving, by a processor, a distorted image captured with a lens that generates distortion in the image;
generating, with the processor, a corrected image by applying a distortion correction algorithm to correct for distortion in the distorted image;
storing, in a computer-readable medium operatively coupled to the processor, a segmented rendered distortion image (SRDI) representing how the distortion in the distorted image is generated, wherein the SRDI is generated by recursively subdividing the SRDI into segments until a distortion function for each of the segments has an approximate inverse function that can be readily calculated; and
thereafter, generating, with the processor, a re-distorted image using the SRDI to re-distort the corrected image.

2. The method claim 1 further comprising editing the corrected image by adding one or more undistorted computer graphic objects to the corrected image prior to generating the re-distorted image.

3. The method of claim 1 further comprising storing a plurality of entries, each of the plurality of entries including information that identifies a portion of the corrected image, a portion of the distorted image corresponding to the portion of the corrected image, and an approximate inverse function that can be readily calculated to re-distort the portion of the corrected image.

4. The method of claim 3 wherein the plurality of entries is stored in a lookup table.

5. The method of claim 4 wherein the lookup table comprises a quadtree.

6. The method of claim 1 wherein a total number of the segments is significantly less than a total number of pixels in the corrected image.

7. The method of claim 6 wherein each of the segments of the SRDI is represented by a color value that is unique within the SRDI.

8. The method of claim 1, wherein the approximate inverse function for a segment is determined to be readily calculated when the corresponding distortion function is determined to be approximately linear when restricted to the segment.

9. A non-transitory, computer-readable medium comprising instructions that, when executed by one or more processors, cause the one or more processors to perform operations comprising:
receiving a distorted image captured with a lens that generates distortion in an image;
generating a corrected image by applying a distortion correction algorithm to correct for distortion in the distorted image;
storing a segmented rendered distortion image (SRDI) representing how the lens generates the distortion in the distorted image, wherein the SRDI is generated by recursively subdividing the SRDI into segments until a distortion function for each of the segments has an approximate inverse function that can be readily calculated; and
generating a re-distorted image using the SRDI to re-distort the corrected image.

10. The non-transitory, computer-readable medium of claim 9, further comprising additional instructions that cause the one or more processors to perform additional operations comprising:
editing the corrected image by adding one or more undistorted computer graphic objects to the corrected image prior to generating the re-distorted image.

11. The non-transitory, computer-readable medium of claim 9, further comprising additional instructions that cause the one or more processors to perform additional operations comprising:
storing a plurality of entries, each of the plurality of entries including information that identifies a portion of the corrected image, a portion of the distorted image corresponding to the portion of the corrected image, and an approximate inverse function that can be readily calculated to re-distort the portion of the corrected image.

12. The non-transitory, computer-readable medium of claim 9, wherein:
a total number of the segments is significantly less than a total number of pixels in the corrected image.

13. The non-transitory, computer-readable medium of claim 9, wherein each of the segments of the SRDI is represented by a color value that is unique within the SRDI.

14. The non-transitory, computer-readable medium of claim 9, wherein the approximate inverse function for a segment is determined to be readily calculated when the corresponding distortion function is determined to be approximately linear when restricted to the segment.

15. A computer system comprising:
one or more processors;
one or more memory devices comprising instructions that, when executed by the one or more processors, cause the one or more processors to perform operations comprising:
receiving a distorted image captured with a lens that generates distortion in an image;
generating a corrected image by applying a distortion correction algorithm to correct for distortion in the distorted image;
storing a segmented rendered distortion image (SRDI) representing how the lens generates the distortion in the distorted image, wherein the SRDI is generated by recursively subdividing the SRDI into segments until a distortion function for each of the segments has an approximate inverse function that can be readily calculated; and
generating a re-distorted image using the SRDI to re-distort the corrected image.

16. The computer system of claim 15, wherein the one or more memory devices further comprises additional instructions that cause the one or more processors to perform additional operations comprising:
editing the corrected image by adding one or more undistorted computer graphic objects to the corrected image prior to generating the re-distorted image.

17. The computer system of claim 15, wherein the one or more memory devices further comprises additional instructions that cause the one or more processors to perform additional operations comprising:
storing a plurality of entries, each of the plurality of entries including information that identifies a portion of the corrected image, a portion of the distorted image corresponding to the portion of the corrected image, and an approximate inverse function that can be readily calculated to re-distort the portion of the corrected image.

18. The computer system of claim 15, wherein:
a total number of the segments is significantly less than a total number of pixels in the corrected image.

19. The computer system of claim 15, wherein each of the segments of the SRDI is represented by a color value that is unique within the SRDI.

20. The computer system of claim 15, wherein the approximate inverse function for a segment is determined to be readily calculated when the corresponding distortion function is determined to be approximately linear when restricted to the segment.

\* \* \* \* \*